Figure 1C:

United States Patent [19]

Ando et al.

[11] 4,371,467
[45] Feb. 1, 1983

[54] PROCESS FOR PRODUCING ISOINDOLINONE PIGMENTS

[75] Inventors: Hirohito Ando; Naoki Furukawa, both of Hazaki, Japan

[73] Assignee: Dainippon Ink and Chemicals Inc., Tokyo, Japan

[21] Appl. No.: 191,504

[22] Filed: Sep. 29, 1980

[30] Foreign Application Priority Data

Oct. 3, 1979 [JP] Japan ............... 54/126886

[51] Int. Cl.³ ............... C07D 209/50; C07D 401/14; C07D 403/14; C07D 417/14
[52] U.S. Cl. ............... 260/165; 542/443; 546/272; 548/159; 106/288 Q; 549/460
[58] Field of Search ............... 260/325 PH, 165, 315; 542/443; 546/272; 548/159

[56] References Cited

U.S. PATENT DOCUMENTS

| | | | |
|---|---|---|---|
| 2,537,352 | 1/1951 | Jones | 260/325 PH |
| 2,573,352 | 10/1951 | Nicodemus | 43/55 |
| 3,532,687 | 10/1970 | Pugin et al. | 260/325 PH |
| 3,758,497 | 9/1973 | Pugin et al. | 260/325 PH |
| 4,223,152 | 9/1980 | Fujii et al. | 260/325 PH |

FOREIGN PATENT DOCUMENTS

| | | |
|---|---|---|
| 34-17189 | 5/1959 | Japan . |
| 47-39565 | 10/1972 | Japan . |
| 51-25526 | 3/1976 | Japan . |
| 51-42610 | 11/1976 | Japan . |
| 52-5840 | 1/1977 | Japan . |
| 52-124022 | 10/1977 | Japan . |
| 52-128923 | 10/1977 | Japan . |
| 53-35579 | 9/1978 | Japan . |
| 55-12106 | 1/1980 | Japan ............ 260/325 PH |

*Primary Examiner*—Alton D. Rollins
*Attorney, Agent, or Firm*—Sherman & Shalloway

[57] ABSTRACT

A process for producing an isoindolinone pigment, which comprises hydrolyzing a salt formed from an isoindolinone compound of the formula

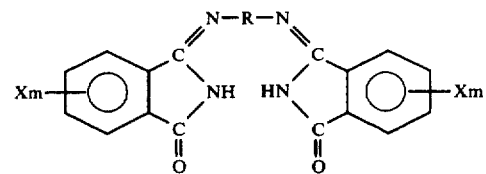

wherein X represents a chlorine or bromine atom, R represents an aromatic group or a heterocyclic group, and m is 0 or an integer of 1 to 4, and a base, in water in the presence of an organic solvent not miscible freely with water.

6 Claims, 4 Drawing Figures

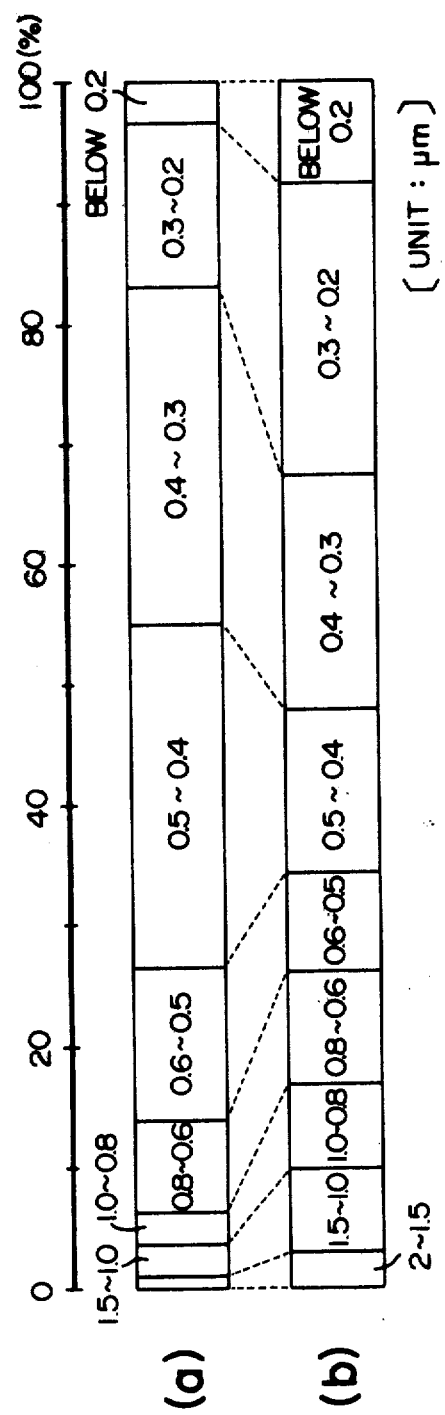

PROCESS FOR PRODUCING ISOINDOLINONE PIGMENTS

This invention relates to a process for producing an isoindolinone pigment having excellent hiding power, weatherability and dispersibility which is in the form of nearly spherical particles having a uniform particle diameter.

It is known from the specification of U.S. Pat. No. 2,537,352 and Japanese Patent Publication No. 4488/59 (Corresponding to Swiss Pat. No. 346218) that isoindolinone pigments are useful as yellow coloring agents. In recent years, a method for production of these pigments was disclosed, for example, in Japanese Patent Publications Nos. 42610/76 and 35579/78. Pigments, so-called pigment crudes, produced by the methods disclosed in these patent documents are composed of pillar-like particles of non-uniform particle diameters, and their properties representing suitability as a pigment, such as dispersibility, color separability, tinting strength and hiding power and the gloss of a film of a paint therefrom, are poor.

In order to improve the suitability of isoindolinone compounds as pigments, various pigmentation treatments have been proposed to date. For example, there has been known a method which comprises reacting an isoindolinone compound with a base such as sodium methylate in a hydrophilic organic solvent and then hydrolyzing the resulting product with water or an acid (Japanese Patent Publication No. 39565/72 corresponding to U.S. Pat. Nos. 3,532,687 and 3,758,497), a method which comprises treating an isoindolinone compound with an alkylamine (Japanese Laid Open Patent Publication No. 25526/76), and a method which comprises hydrolyzing an alkali metal salt of an isoindoline compound with a hydrophilic organic solvent (Japanese Laid-Open Patent Publication No. 128923/77). The pigments obtained by these methods have a fine particle size with a specific surface area of 40 to 85 m$^2$/g. They have excellent transparency but poor hiding power.

As another pigment-forming method, hydrolysis of an alkali metal salt of an isoindolinone compound in water at an elevated temperature or with an acid is known (Japanese Laid-Open Patent Publication No. 124022/77). The pigment obtained by this method has a specific surface area of 30 to 50 m$^2$/g, and therefore, in order to increase its hiding power, it must be subjected to pigmentation treatment using titanium oxide having an effect of imparting hiding power as shown in Example 2 of Japanese Laid-Open Patent Publication No. 124022/77. The pigment so obtained is still not entirely satisfactory because its other properties such as tinting strength are necessarily degraded, and its uses are limited.

Pigmentation treatment by which isoindolinone pigments now commercially available are manufactured is known. It has been pointed out however by paint manufacturers that metallic paints obtained from these pigments and an aluminum metal powder, when coated and exposed outdoors, turn brown. It has been desired therefore to improve the weatherability of these pigments. On the other hand, there has recently been a tendency to use the isoindolinone pigments as substitutes for inorganic pigments which may cause a toxicity hazard, such as yellow lead or cadmium yellow, and therefore, it has been increasingly desired to develop isoindolinone pigments having high hiding power and good dispersibility.

It is an object of this invention therefore to provide an isoindolinone pigment capable of meeting these desires.

In order to achieve this object, the present inventors investigated the particle shape, diameter, particle size distribution, specific surface area, etc. of isoindolinone pigments. In the initial stage of their investigations, they attempted to obtain pigments having large particles with a low specific surface area by heat-treating isoindolinone pigment crudes in an organic solvent such as o-dichlorobenzene, nitrobenzene and dimethylformamide. Although the pigments obtained by this treatment have a large particle diameter to some extent, they lack uniformity of particle diameters. Accordingly, although their hiding power was improved, their other properties such as tinting strength, gloss and color separability were aggravated. When the treating temperature was elevated, crystal conversion occurred, and the desired pigments could not be obtained, as described in Japanese Laid-Open Patent Publication No. 5840/77.

The present inventors furthered their investigations about pigmentation, and found that the above object of this invention can be achieved by hydrolyzing a salt formed between an isoindolinone compound of the formula

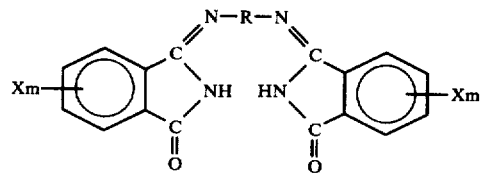

wherein X represents a chlorine or bromine atom, R represents an aromatic group or a heterocyclic group, and m represents 0 or an integer of 1 to 4, and a base, in water in the presence of an organic solvent not freely miscible with water.

According to this pigment-forming treating method of this invention, isoindolinone pigments having a nearly spherical particle shape and a uniform particle diameter can be obtained for the first time. These pigments have a brilliant color and very high hiding power, and better dispersibility, gloss, color separability, flowability, tinting strength, weatherability, light fastness, heat resistance, etc. than conventional isoindolinone pigments.

Since in the present invention, the salt formed from the isoindolinone compound and a base is hydrolyzed, the isoindolinone compound used in salt formation may be a pigment crude not treated for pigmentation or a pigment already subjected to another pigmentation treatment.

The isoindolinone compounds having the above general formula are known from U.S. Pat. No. 2,573,352, Japanese Patent Publication No. 4488/59, other patent documents, and general technical literature. Typical examples of the group —R— in the above formula include a 1,2-, 1,3-, or 1,4-phenylene group; a 2,2'- or 4,4'-diphenylene group; diphenylene derivative groups such as a 4,4'-diphenylenesulfide group, a 4,4'-diphenyleneurea group, a stilben-4,4'-ylene group, a benzoylanilin-4,4'-ylene group, an azobenzen-4,4'-ylene group, a 4,4'-diphenyleneether group or a 4,4'- diphenylenemethane group; a 1,4-naphthylene group; and heterocyclic groups such as a pyridin-2,6-ylene group, a pyridin-2,5-ylene group, a benzothiazol-2,5-ylene group or a carbazol-3,6-ylene group. These groups may have a substituent such as a lower alkyl group, a lower alkoxy group or a halogen atom.

The salt of the isoindolinone compound with the base can be obtained, as already described in Japanese Patent Publication No. 39565/72, Japanese Laid-Open Patent Publication No. 25526/76, etc., by reacting the isoindolinone compound with a salt-forming base, for example, a hydroxide, carbonate, alcoholate or amide of an alkali metal; amines such as monoalkylamines or dialkylamines; or quaternary ammonium hydroxide compounds such as benzyl trimethyl ammonium hydroxide in the presence or absence of water and another solvent. The salt formation can be determined, in most cases, by a change in color after the reaction.

The reaction of hydrolyzing the salt of the isoindolinone compound in water in the presence or an organic solvent not freely miscible with water is a rapid reaction which easily proceeds even at ordinary temperatures.

The organic solvent may be present in trace in water. Preferably, the amount of the organic solvent is at least 0.05 part by weight per 100 parts by weight. The content of the organic solvent in water may be increased as desired so long as water is present in an amount sufficient to hydrolyze the salt of the isoindolinone compound. When the amount of the organic solvent in water is too large, the surface of the resulting pigment after the hydrolysis shows hydrophobicity, and the base formed at the time of hydrolysis is difficult to remove by washing the pigment with water. In such a case, it is advisable to wash the pigment first with a hydrophilic organic solvent such as alcohols and dimethyl formamide, and then wash it with water. From an economical viewpoint, it is preferred to use water in performing the washing step after the hydrolysis. Accordingly, the preferred amount of the organic solvent in water is not more than 100 parts, especially not more than 10 parts, by weight per 100 parts by weight of water.

The hydrolysis reaction is achieved by dispersing (preferably dispersing with agitation) the salt of the isoindolinone compound in water in the presence of an organic solvent not freely miscible with water. The concentration of the isoindolinone salt in the reaction system is the one which permits dispersion of the salt, but is usually up to about 50%, especially up to about 20%, based on the entire hydrolysis reaction system.

The hydrolysis reaction temperature greatly affects the particle diameter of the resulting pigment. As the hydrolysis temperature increases, pigment particles having a larger particle diameter and a lower specific surface area are obtained, and therefore, the hiding power of the pigment increases. Generally, a temperature of 0° to 100° C., preferably 20° to 90° C., is employed. If required, a temperature of more than 100° C. may be used by means of an autoclave. The time required for the hydrolysis reaction varies depending upon the reaction temperature, and is usually not more than 1 hour and is sometimes several hours depending upon the reaction conditions.

The organic solvent used in this invention should not be freely miscible with water, and may, for example, be aromatic and aliphatic compounds and their derivatives, such as benzene, toluene, xylene, ethylbenzene, other (poly)alkylbenzenes, nitrobenzene, mono-, di- or tri-chlorobenzene, anisole, phenethol, dimethylaniline, quinoline, decalin, di- or tri-chloroethane, n-hexane, cyclohexane, saturated aliphatic alcohols having 4 to 8 carbon atoms, methyl benzoate, ethyl benzoate, dipropyl ether, dibutyl ether, dioxane, tetrahydrofuran, liquid paraffin, diphenyl, diphenyl ether, diphenylmethane, and phthalic esters. Since such an organic solvent is not freely miscible with water, it can be recovered with good efficiency by steam distillation, etc. as required.

According to the process of this invention, there can be easily obtained an isoindolinone pigment in the form of nearly spherical particles with a uniform particle diameter which has been unable to be obtained by conventional techniques. The pigment obtained by the process of this invention has excellent pigment suitability represented by hiding power, tinting strength, dispersibility, weatherability, light fastness, color separability and gloss, etc., and is characterized by having a specific surface area of 10 to 30 $m^2/g$. Although a pigment having a specific surface area of less than 10 $m^2/g$ can be produced by the process of this invention, such a pigment tends to have poor tinting strength although having superior hiding power, light fastness, etc.

Furthermore, since water is used as a main solvent in the process of this invention, it is very advantageous in industrial operations.

The pigments obtained by the process of this invention are suitable for coloring paints, printing inks, and plastics. Since they have outstanding hiding power and weatherability not seen in conventional isoindolenine pigments, they are especially suitable for use in exterior and automotive paints.

The following Examples illustrate the present invention specifically. All parts and percentages in these examples are by weight.

EXAMPLE 1

Twenty parts of a sodium salt of bis-(4,5,6,7-tetra-chloroisoindolin-1-on-3-ylidene)-phenylenediamine (1,4) was dispersed in 200 parts of water, and 2 parts of xylene was added. The mixture was gradually heated, and stirred at 80° C. for 1 hour. Reddish yellow crystals resulting from hydrolysis were hot-filtered, and sufficiently washed with water until the filtrate became neutral. After drying, 17 parts of a pigment was obtained. The pigment had a specific surface area, measured by the BET method, of 22 $m^2/g$.

Figure 1B:
Figure 1A:

In the accompanying drawings, FIG. 1 shows electron microphotographs (5000 X) of (a) the pigment obtained in Example 1, (b) a commercial pigment "Irgazin Yellow 3RLTN" (a product of Ciba-Geigey; specific surface area 26 $m^2/g$) having the same molecular structure as the pigment obtained in Example 1, and (c) a pigment (specific surface area 24 $m^2/g$) obtained by heat-treating a pigment crude having the same molecular structure as the pigment obtained in Example 1, in dimethyl formamide at 130° C. for 1 hour.

It is seen from FIG. 1 that the pigment (a) consists of very uniform and nearly spherical crystals.

To demonstrate excellent pigment suitability characteristics of the pigment (a), it was compared with the commercial pigment "Irgazin Yellow 3RLTN" (b) in the following manner.

Four parts of the pigment (a), 13 parts of an acrylic/-melamine resin, 13 parts of a thinner (a mixture of xylene and butanol=7/3) and 90 parts of glass beads were dispersed for 2 hours in a 100 ml. broad-mouthed bottle using a paint conditioner. Then, 50 parts of the resin was additionally supplied, and the mixture was dispersed further for 10 minutes to prepare a test paint.

On the other hand, a comparative test paint was prepared by the same procedure as above using 4 parts of the commercial pigment (b) instead of the pigment (a).

In the accompanying drawings, FIG. 2 is a graph showing the particle size distributions of the pigments in the resulting paints which were measured by a "Shimazu centrifugal sedimentation type particle size distribution tester (CP-50, a product of Shimazu Seisakusho).

It is seen from FIG. 2 that the content of particles having a particle diameter of 0.2 to 0.6 μm is about 83% in the pigment (a) obtained in Example 1 and about 57% in the commercial pigment (b), and that the content of particles having a particle diameter of 0.3 to 0.5 μm is about 57% in the pigment (a) but only about 33% in the commercial pigment (b).

The pigment suitability characteristics were compared using the test paints. It was found that the pigment (a) has superior color brightness, hiding power, tinting strength, gloss, flowability and color separability. For example, by measurement with a gloss meter, the gloss of the paint film was 99% in the case of using the pigment (a), and 95% in the case of using the commercially pigment (b).

Furthermore, the pigment was kneaded with a metallic aluminum powder, an acrylic-melamine resin and a thinner to prepare a metallic paint. The weatherability of a zinc phosphate-treated steel plate which was coated with the resulting metallic paint was tested, and the color difference ΔE after one year outdoor exposure was determined. The results are shown in Table 1.

TABLE 1

| Amounts of coloring components contained in the metallic paint film | Color difference (ΔE) | |
|---|---|---|
| | Pigment (a) | Commercial pigment (b) |
| One part of the pigment and 1 part of aluminum | 0.94 | 2.18 |
| One part of the pigment and 5 parts of aluminum | 1.58 | 2.39 |

EXAMPLE 2

The same sodium salt as described in Example 1 was maintained at a hydrolysis temperature of 40° C. for 3 hours using diphenyl ether instead of xylene. A pigment was obtained which was in the form of nearly spherical particles having a specific surface area, measured by the BET method, of 28 m²/g. The various pigment suitability characteristics of the resulting pigment were as superior as the pigment obtained in Example 1. It showed a slightly reddish shade in deep color and had higher tinting strength.

EXAMPLE 3

Twenty-five parts of an n-butylamine salt of bis(4,5,6,7-tetrachloroisoindolin-1-on-3-ylidene)-1-methylphenylenediamine (2,6) was dispersed in 300 parts of water, and then 10 parts of o-dichlorobenzene was added. The mixture was heated to 90° C., and stirred at this temperature for 1 hour to hydrolyze the salt. Then, under reduced pressure, o-dichlorobenzene and n-butylamine were distilled off and recovered. The crystals were filtered, washed thoroughly with water, and then dried to afford 18 parts of a bluish yellow pigment. The particles of the pigment were nearly spherical, and had a specific surface area, measured by the BET method, of 18 m²/g.

The pigment obtained in Example 3 was compared with a commercial pigment "Irgazin Yellow 2GLT" (a product of Ciba-Geigy; specific surface area 24 m²/g).

A dry color composed of 6 parts of the pigment and 2 parts of zinc stearate was blended with polypropylene. The blend was injection-molded by a 3-ounce line-screw type injection molding machine at a molding temperature of 280° C. with a residence time of 0 minute, 10 minutes, and 20 minutes, respectively to perform a heat resistance test.

In the case of using the commercial pigment, the color of the colored molded plate obtained after a residence time of 20 minutes was slightly reddish and transparent as compared with the molded plate obtained with a residence time of zero. In contrast, when the pigment in accordance with the present invention was used, no change occurred in the color of the colored plate (this means that the heat resistance of the colored plate was very good).

The colored molded plates were each exposed outdoors for one year. In the case of using the commercial pigment, the plate turned slightly blackish, but in the case of using the pigment obtained in Example 3, no discoloration was noted.

EXAMPLES 4 TO 18

Salts formed from various isoindolinone compounds and various bases were treated in the same way as in Example 1 under the conditions shown in Table 2. The results are shown in Table 2. In the table, the group

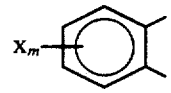

and the group —R— are those in the above-given general formula.

TABLE 2

| Example | Group $X_m$-⌬ | Group —R— | Form of salt | Organic solvent | Hydrolysis temperature (°C.) | Color | Specific surface area (m²/g) |
|---|---|---|---|---|---|---|---|
| 4 | Cl, Cl, Cl, Cl | H₃CO-⌬-⌬-OCH₃ | K | Cyclohexane | 50 | Red | 24 |
| 5 | " | -⌬-N=N-⌬- | K | Toluene | 90 | Orange | 15 |

TABLE 2-continued

| Example | Group $X_m$-⌬- | Group —R— | Form of salt | Organic solvent | Hydrolysis temperature (°C.) | Color | Specific surface area (m²/g) |
|---|---|---|---|---|---|---|---|
| 6 | " | 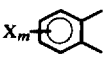 | Isopropylamine | Quinoline | 90 | Orange | 28 |
| 7 | 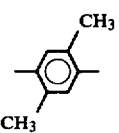 |  | Na | Dichloroethane | 80 | Yellow | 13 |
| 8 | 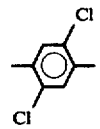 |  | Na | n-Butanol | 40 | Reddish yellow | 24 |
| 9 | 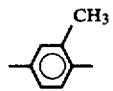 | 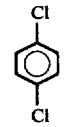 | Na | Liquid paraffin | 20 | Yellow | 29 |
| 10 | 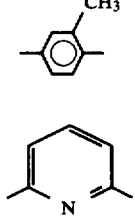 |  | n-Propylamine | Benzene | 60 | Reddish yellow | 21 |
| 11 |  | " | " | Dioxane | 80 | Reddish yellow | 18 |
| 12 | " | 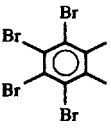 | Diethylamine | Decalin | " | Red | 18 |
| 13 | 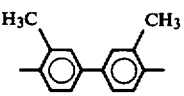 |  | Na | Anisole | " | Reddish yellow | 24 |
| 14 | 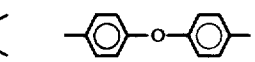 |  | Na | Methyl benzoate | " | Red | 14 |
| 15 | 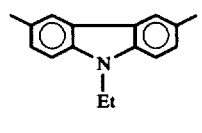 |  | Li | Dimethyl phthalate | 60 | Yellow | 19 |
| 16 | 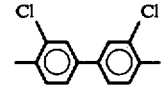 |  | Li | Nitrobenzene | 40 | Reddish yellow | 27 |
| 17 | 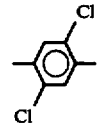 |  | Na | Dibutyl ether | 80 | Bluish yellow | 22 |

TABLE 2-continued

| Example | Group $X_m$-⌬ | Group —R— | Form of salt | Organic solvent | Hydrolysis temperature (°C.) | Color | Specific surface area (m²/g) |
|---|---|---|---|---|---|---|---|
| 18 |  |  | Na | n-Hexane | 30 | Orange | 28 |

What we claim is:

1. A process for producing an isoindolinone pigment, which comprises (1) dispersing a salt formed from an isoindolinone compound of the formula

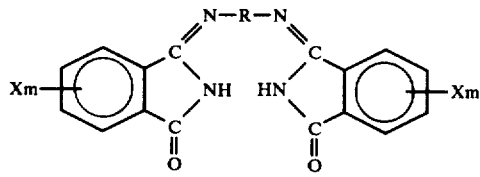

wherein X represents a chlorine or bromine atom, R represents 1,2-, 1,3- or 1,4-phenylene group, 2,2' or 4,4'-diphenylene group, 4,4'-diphenylenesulfide group, 4,4'-diphenyleneurea group, stilben-4,4'-ylene group, benzoylanilin-4,4'-ylene group, azobenzen-4,4'-ylene group, 4,4'-diphenyleneether group, 4,4'-diphenylenemethane group, 1,4-naphthylene group, pyridin-2,6-ylene group, pyridin-2,5-ylene group, benzothiazole-2,5-ylene group or carbazol-3,6-ylene group, these groups being optionally substituted by a lower alkyl group, a lower alkoxy group or a halogen atom and m is 0 or an integer of 1 to 4, and a base, in water, and then (2) adding thereto an organic solvent not miscible freely with water to hydrolyze the salt.

2. The process of claim 1 wherein the amount of the organic solvent is 0.05 to 100 parts by weight per 100 parts by weight of water.

3. The process of claim 2 wherein the amount of the organic solvent is 0.05 to 10 parts by weight per 100 parts by weight of water.

4. The process of claim 1 wherein the amount of the salt is up to 50% by weight based on the entire hydrolysis reaction system.

5. The process of claim 4 wherein the amount of the salt is up to 20% by weight based on the entire hydrolysis reaction system.

6. The process of claim 1 wherein the hydrolysis is carried out at a temperature of 0° to 100° C.

* * * * *